Inventors
Eugene T. Booth
Michael L. Skolnick
By [signature]
Attorney

April 26, 1966 E. T. BOOTH ETAL 3,248,548

LASER STRUCTURE HAVING ELECTRODELESS DISCHARGE PUMPING SOURCE

Filed Nov. 19, 1962 3 Sheets-Sheet 2

Inventors
Eugene T. Booth
Michael L. Skolnick
By [signature]
Attorney

Inventors
Eugene T. Booth
Michael L. Skolnick
By [signature]
Attorney

United States Patent Office
3,248,548
Patented Apr. 26, 1966

3,248,548

LASER STRUCTURE HAVING ELECTRODELESS DISCHARGE PUMPING SOURCE

Eugene T. Booth, Briarcliff Manor, and Michael L. Skolnick, New York, N.Y., assignors to Laser Incorporated, Briarcliff Manor, N.Y., a corporation of New York
Filed Nov. 19, 1962, Ser. No. 238,630
1 Claim. (Cl. 250—199)

This invention relates to the modulation of light by a radio-frequency signal. In a specific sense, the invention is directed to procedures and apparatus for producing a modulated beam of light, and to communications systems employing such modulated beam as a medium for wireless transmission of voice or other messages within a line-of-sight range.

Because the transmission of a beam of light can readily be made much more directional than ordinary transmission of radio waves, the use of modulated light as a transmitting medium would enable wireless communication of advantageously superior directivity (as compared with conventional radio communication), within the line-of-sight range to which light transmission is of course necessarily limited. In military communications systems, as for example between ground personnel, between aircraft at high altitudes, or between submerged submarine vessels, such high directivity of transmission from sending to receiving stations would substantially obviate the possibility of undesired detection and eavesdropping or jamming. Transmission of messages by light could also afford a convenient system, outside of the crowded radio frequency bands, for private communications.

The provision of a practicable light beam or optical communications system requires a source of light, modulation of the light by a signal representative of the message to be sent, and means at the receiving station for intercepting and demodulating the transmitted beam to recover the message. As will be appreciated, since light decreases in intensity with increasing distance from the source, the range of such a system (within the line-of-sight limit) is directly related to the intensity of the modulated beam as emitted at the transmitting station, and inversely related to the intensity which the beam must have at the receiving station for successful reception. In addition, as in communications systems generally, it is of course important to achieve high signal-to-noise performance.

To provide a modulated beam of light suitable for use as the transmitting medium of such an optical communications system, the present invention contemplates exciting a so-called electrodeless discharge of light in a gas-filled envelope with a radio frequency electric field. The light thus produced is found to oscillate in intensity at radio frequency with characteristics of oscillation proportional to the corresponding characteristics of the exciting field. Thus when a characteristic of the field is modulated, for example by a signal representative of intelligence, the corresponding characteristic of the intensity oscillation of the emitted light will be correspondingly modulated.

Accordingly, the present invention employs as a light source a bulb defining an envelope of gas, the gas used being selected to have the property of emitting light by electrodeless discharge when excited by a high frequency electric field. Very conveniently, the exciting field for the gas may be created by the output of a conventional radio transmitter. Thus, the bulb may be surrounded by a coil constituting an inductor and connected in parallel with a capacitor to provide a resonant tank circuit, which is powered from the output terminals of such a transmitter. With the carrier frequency of the transmitter set at the resonant frequency of the tank circuit, the transmitter output will energize the coil to induce a radio frequency field in the envelope of gas, such field having characteristics of amplitude, frequency and phase proportional to the characteristics of the transmitter output. In turn, this field will excite in the envelope an electrodeless discharge of light from the gas, oscillating in intensity at radio frequency, with corresponding characteristics of oscillation.

Thus if the transmitter output is a carrier wave of constant frequency, the intensity of the emitted light will be impressed with an oscillation of constant frequency that may be considered a carrier oscillation. If the transmitted carrier output is now modulated, as by an audio signal input to the transmitter from a microphone, the field of the coil and hence the light emission from the envelope will be correspondingly modulated. For example, assuming amplitude modulation of the transmitter carrier output, the amplitude of the intensity oscillation of the light discharge will be modulated in the same manner. Similarly, phase modulation or frequency modulation of the transmitter output will produce corresponding phase modulation or frequency modulation of the light-intensity oscillation.

In other words, the transmitter-tank circuit arrangement described above provides a simple and convenient system for creating a radio frequency field (to excite luminous discharge in the envelope of gas) which can be modulated by a signal representative of intelligence to effect modulation of the light emission from the envelope. It will be understood that in this operation the transmitter function is entirely conventional, and produces a modulated radio frequency output just as if it were being employed for ordinary radio transmission; the other elements of the present apparatus serve in effect to translate this output into a modulated emission of light oscillating in intensity at radio frequency.

The modulated light output of the bulb may be used directly as the transmitting medium of an optical communications system. For example, a portion of the light may be directed as a beam by optical means to a desired receiving station and there intercepted by a photomultiplier tube which converts the incident radiant energy to electrical energy; the output of the photomultiplier tube can be directed through appropriate elements for demodulation to recover the message. With this system, good signal-to-noise performance and high sensitivity, enabling communications of desirably long range, can readily be achieved.

Alternatively, the bulb may be arranged so that the modulated emission of light serves as pumping energy for a laser. Lasers are light-amplifying devices, and are specifically adapted to emit beams of high-intensity, coherent, very monochromatic light when excited by incident radiant energy of appropriate wavelength. Such emission may take the form of pulses or may be a continuous output beam, depending upon whether the input of exciting or pumping energy is pulsed or continuous. By using the continuous modulated electroless discharge of the bulb of the present apparatus as pumping energy for a laser, a continuous output of laser emissive energy is obtained, and this laser output beam is similarly modulated and hence can serve as the transmitting medium of an optical communications system in the same manner as the light from the bulb itself. However, owing to the high intensity and in particular to the very narrow beam spread of the laser output (as compared with light emitted by ordinary light sources), a very great increase in range can be achieved by using the laser output as the transmitting medium. As before, the modulated beam is intercepted at the receiving station by a suitable photomultiplier tube, the output of which is sent through appropriate demodulating elements to recover the message.

Further features and advantages of the invention will be apparent from the detailed description hereinbelow set forth, together with the accompanying drawings, wherein.

Figure 1:
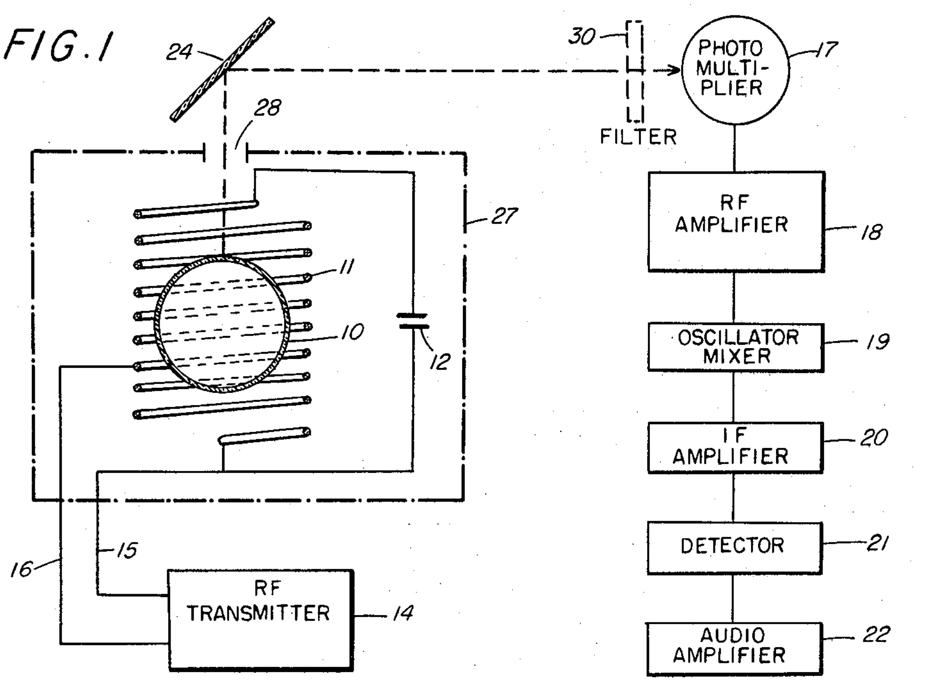
FIG. 1 is a simplified diagrammatic view of an optical communications system embodying the apparatus of the present invention in a particular form.

Referring first to FIG. 1, the apparatus of the invention in its illustrated embodiment includes a bulb 10 (shown in sectional view) comprising a hollow, spherical, sealed vessel of glass or like transparent non-conductive material, supported by suitable non-conductive structure (not shown), and having a radius (for example) of several inches. The interior of this bulb is evacuated to a high vacuum, and contains several drops of mercury as a source of mercury vapor. Surrounding the bulb is a coil 11 constituting an inductor; this coil is connected with a capacitor 12 to provide a resonant tank circuit. The tank circuit is powered from a conventional amplitude-modulation radio frequency transmitter 14 having output terminals 15, 16 connected to the tank circuit in the manner shown.

To produce luminous discharge in the bulb 10, the requisite vapor pressure is developed in the bulb by the moderate application of heat, and the transmitter is set at the resonant frequency of the tank circuit to provide a radio-frequency carrier wave output. The parameters of the tank circuit are preselected for resonance at the desired carrier frequency, for example a frequency in the range between about 0.3 mc. and about 30 mc., it being understood that the latter range constitutes a presently preferred range of operating frequencies. This radio frequency power input to the coil 11 induces a field, within which the bulb 10 is positioned as shown, effective to maintain an electrodeless discharge of light from the mercury vapor in the bulb, after initiation of such discharge as in conventional manner by a Tesla spark coil. The field of the coil 11 is a radio-frequency field, having characteristics (i.e. of amplitude, frequency, and phase) proportional to the corresponding characteristics of the transmitter output.

At low values of voltage across the capacitor 12 the intensity of the discharge in the bulb 10 is observed to be low and concentrated in a sphere of substantially lesser diameter than the bulb. However, when a critical capacitor voltage (dependent upon the dimensions of the bulb and readily determinable for a particular bulb by simple experimentation) is attained, this discharge increases sharply in intensity and occurs throughout the interior of the bulb, while the capacitor voltage drops back to a lower value; and thereafter, as the power input to the tank circuit is increased, the intensity of the light emitted in the bulb increases as a linear function of such power input while the capacitor voltage remains constant. This emission, excited by the radio-frequency field induced by the transmitter output as directed through the coil 11, is found to oscillate in intensity at a frequency determined by the frequency of the transmitter output, i.e. the carrier wave frequency, and with phase and amplitude of oscillation dependent on the phase and amplitude of the radio frequency carrier wave. In other words, it constitutes a discharge of light oscillating in intensity at a constant, radio frequency, the characteristics of the oscillation being proportional to the characteristics of the field, which are in turn proportional to the characteristics of the transmiter ouput. Specifically, the intensity oscillation is observed to have components at both the fundamental and the first harmonic of the transmitter carrier wave.

Since the radio transmitter 14 is of conventional character, its carrier wave output may be amplitude-modulated by an input signal representative of intelligence to be transmitted. By way of example, when a voice message is spoken into a microphone (not shown) connected to the transmitter, the output of the transmitter is amplitude-modulated by the audio frequency signal representative of the message, in a wholly conventional manner well known to those skilled in the art. With the elements of the present apparatus arranged and operating as described above, such amplitude modulation of the transmitter output produces a corresponding amplitude modulation of the intensity oscillation of the light emitted in the bulb 10. This latter modulation is observable as a visible flickering of the emitted light. Consequently, the light produced by electrodeless discharge in the bulb now constitutes an emission of amplitude modulated, radio-frequency oscillating intensity, and can be directed as a modulated light beam providing a transmitting medium for line-of-sight range wireless communication.

To provide a complete optical communications system, the apparatus of FIG. 1 further includes a receiving system comprising a photomultiplier tube 17 powered from an appropriate source (not shown), and a conventional short-wave amplitude-modulation radio receiver represented by the successive stages indicated as RF amplifier and tuned circuits 18, oscillator-mixer 19, IF amplifier 20, detector 21, and audio amplifier 22, producing an audible signal through a loudspeaker (not shown). The output of the photomultiplier tube is connected to the antenna terminals of the receiver. A portion of the modulated light emitted in the bulb 10 is directed to the photomultiplier tube as by a plane mirror 24.

Interception of light from the bulb 10 by the photomultiplier tube 17 produces a noise output audible on the receiver loudspeaker at all frequencies with the receiver gain set sufficiently high. If the oscillating intensity of this light is amplitude-modulated, for example by voice signal as described above, the visible fluctuations in the light intensity produce corresponding fluctuations or modulations of the photomultiplier noise output, and these fluctuations are presented on the loudspeaker as an understandable reproduction of the voice signal above the general noise level, again audible at all frequencies. Similar understandable reception of the voice signal can be obtained by connecting the photomultiplier output directly to an audio amplifier 26, in the simplified receiving system shown in FIG. 2, and presenting the amplifier output over a loudspeaker. This reception, which may be termed untuned or noise mode reception, is adequate in intelligibility to provide a simple and workable optical communications system, although it is not of high quality, the signal-to-noise ratio being comparatively low. It is believed that such reception is due to the so-called shot effect, whereby light incident on a photomultiplier tube causes the voltage across the output resistor of the tube to fluctuate with a noise voltage directly related to the intensity of the incident light, providing a wide-band noise output.

However, the oscillating-intensity beam from the bulb 10 (which as previously noted has components at both the fundamental and first harmonic of the carrier wave) also causes the photomultiplier tube to produce a radio-frequency, amplitude modulated carrier wave output having the same frequency components. Thus with the photomultiplier output connected to the radio receiver of FIG. 1, a very sharp signal is obtained when the receiver is tuned to the first harmonic of the carrier wave output of the transmitter 14, providing reproduction of the transmittted message (on the receiver loudspeaker) that is of desirably high quality, with an advantageously high signal-to-noise ratio. A signal of lower but still good quality is also obtained when the receiver is tuned to the fundamental of the carrier wave. In other words, the radio frequency photomultiplier output resulting from the interception of the modulated beam by the tube is demodulated by the tuned receiver just as if it were received by direct radio frequency transmission. As will be appreciated, with such tuned reception the significant advantages of the invention in providing optical communications of high sensitivity and superior signal-to-noise performance are most fully realized, and accordingly the use of such mode of reception, with the receiver tuned to the first harmonic of the carrier wave frequency, is presently preferred.

It will be understood that the apparatus of FIG. 1 is illustrated and described in somewhat simplified form and that in practice an optical communications system arranged in accordance with the foregoing description may include supplemental structures and elements. For example, it may be desired to shield the tank circuit in order to prevent transmission of a radio frequency signal beyond the locality of excitation of the bulb 10. For this purpose, the tank circuit might simply be surrounded by a metal box as represented in FIG. 1 by the broken line 27, having a suitably positioned and dimensioned aperture 28 to permit transmission of a portion of the light emitted by the bulb 10. It may also be desirable to cool the surface of the bulb 10 during operation, as with a current of air provided by a conventional blower.

By way of specific example, a spherical glass vessel or bulb of approximately one liter capacity (radius 2.5 inches) is evacuated to a pressure of about $5\times10^{-6}$ mm. of mercury and sealed, a few drops of mercury being placed within the evacuated bulb before sealing. A tank circuit designed as illustrated in FIG. 1 and having a resonant frequency of about 3.5 mc. is energized with a 3.5 mc. carrier wave output from a 180 watt Heathkit amplitude-modulation radio frequency transmitter, and the bulb is placed within the field of the tank circuit inductor as shown. With the bulb heated and ignited, the field induced by passage of the transmitter output through the inductor excites an essentially continuous electrodeless discharge of light from the mercury vapor in the bulb. This discharge is initially at low intensity and confined to the central portion of the bulb, slowly increasing in intensity as the voltage across the capacitor of the tank circuit rises. When the capacitor voltage reaches about 410 v., however, the intensity of the luminous discharge abruptly and sharply increases, concomitantly expanding to fill the entire interior of the bulb, while the capacitor voltage drops back to about 250 v. Thereafter the capacitor voltage remains stable at the latter value, while the intensity of the electrodeless discharge increases in linear relation to the power input to the tank circuit from the transmitter.

An continuous input of about 50 watts of 3.5 mc. power to the bulb is established for operation of the apparatus as a source of modulated light. With such input, the temperature of the bulb may be about 50° C., providing an internal vapor pressure of about .01 mm. of mercury; and the light output of the bulb is measured as about 30 candlepower. This light output can be observed on an oscilloscope to be of oscillating intensity, having frequency components of 3.5 mc. (the transmitter carrier wave frequency) and 7 mc. (the first harmonic of that frequency). When the transmitter output is amplitude-modulated by a voice message spoken into a microphone (not shown) connected to the transmitter, the intensity of the light emission from the bulb is observed to fluctuate visibly.

In a darkened room, a portion of this light emission is directed by a mirror to a photomultiplier tube of the type commercially known as a General Electric No. 931-A photomultiplier, the output of which is connected to the antenna terminals of a conventional short wave amplitude-modulation radio receiver. Noise mode reception of understandable quality is obtained with the receiver in any tunable position, an intelligible reproduction of the voice message as transmitted by the modulated light being heard over the receiver loudspeaker above a fairly high level of noise. Tuned reception of high quality is also obtained when the receiver is tuned either to the fundamental or to the first harmonic of the transmitter carrier wave. Optimum reception with very good signal-to-noise performance is found when the receiver is tuned to the first harmonic, i.e. 7 mc. A distinct signal is still obtained when the output of the bulb is partially masked to reduce the light reaching the photomultiplier to about $1.3\times10^{-6}$ lumens.

Referring to operation of the type illustrated by the foregoing example, certain operating characteristics of the system as shown may be more particularly considered. Under the indicated conditions of temperature and pressure, i.e. at pressures very substantially below one atmosphere, the electrodeless discharge in the bulb is quite monochromatic, exhibiting the sharp line spectrum characteristic of mercury discharge, and the line width does not vary observably with variations in the intensity of the discharge such as result from variations in the power input to the bulb. The intensity of the discharge is as previously mentioned directly related to the magnitude of the power input. As the power increases, however, the temperature and consequently the vapor pressure within the bulb rise concomitantly, and at substantially higher pressures than that indicated in the example there is perceptible collision broadening of the spectral lines, until at pressures in the range of about 10 to about 30 atmospheres the spectrum of the emission is almost continuous.

It is also observed that, at least within broad limits, the gross light output of the bulb is apparently independent of the bulb dimensions. In consequence the specific intensity of the discharge may be increased by decreasing the dimensions selected for the bulb employed. The critical value of capacitor voltage (at which the aforementioned sudden increase in discharge intensity occurs), however, is found to be inversely related to the bulb radius.

As will further be appreciated, the simplified system shown in FIG. 1 can be used effectively for communication only under natural or artificial conditions of darkness. Since the photomultiplier tube 17 responds to any light with a noise output, its exposure for example to ordinary daylight produces a background noise level high enough to prevent intelligible reception of the signal transmitted by the light from the bulb 10. To overcome this difficulty, the photomultiplier may be shielded in such manner that light can reach it only through a narrow band pass filter 30 represented by broken lines in FIG. 1. The filter 30 is selected to pass only light in the wavelengths corresponding to the strongest emission line of the essentially monochromatic discharge from the bulb 10, such filters being entirely conventional and well known in the art, and is aligned with the modulated beam from the bulb so that the beam passes through it to the tube 17. Although the component of daylight or other background light having such wavelengths will also pass through the filter to the tube, the emission from the bulb 10 is sufficiently stronger than background light at this wavelength (within the range of the communication system) to enable intelligible reception of the transmitted signal even in daylight or like conditions of background brightness.

The system of FIG. 1, as operated under the conditions represented by the example, is limited in range by the intensity of that portion of the discharge in the bulb which is directed to the photomultiplier, and also by the sensitivity of the receiving station. Thus, for example, the range of the system may be increased by employing at the receiving station a photomultiplier tube of very high sensitivity. Furthermore, since the sensitivity of a particular photomultiplier is governed by the voltage applied to the dynodes of the tube, it will be apparent to those skilled in the art to select optimum values of such voltage for optimum sensitivity of the tube used.

Another way of increasing the range of the system of FIG. 1 is to increase the intensity of the modulated beam as emitted at the transmitting station. Such increase in intensity of emission may be accomplished by increasing the power input to the tank circuit, since as previously noted the intensity of emission from the bulb 10 is directly related to the power input. In addition, the size of the bulb used may be decreased to increase the specific intensity of the luminous discharge, i.e. because it is found that the gross light output of the bulb is independent of the bulb diameter.

A particularly effective and advantageous manner of increasing the intensity of the emitted beam, however, involves increasing the efficiency of the transmission. In the apparatus of FIG. 1 only a small portion of the light emitted in the transparent bulb 10 is directed to the photomultiplier tube, viz. only that portion directed toward the mirror 24; the remainder of the luminous discharge is dissipated by radiation in all other directions. If a greater proportion of the emitted light is utilized for transmission, the transmitted beam resulting from a given power input will be augmented in intensity, minimizing input power requirements for transmission over a desired range.

Figures 2, 3:
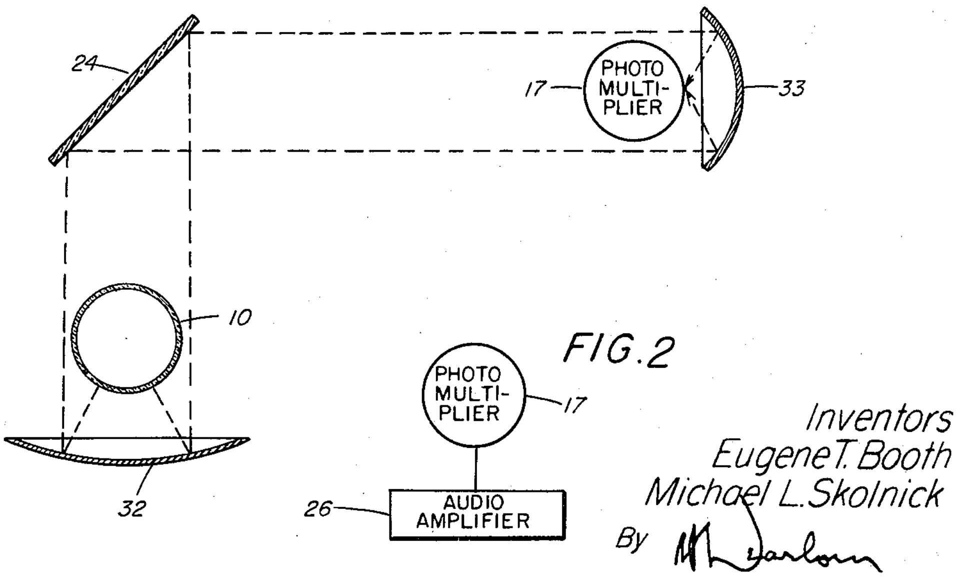
FIG. 2 is a diagrammatic view of an alternative receiving system for use with the apparatus of FIG. 1.
FIG. 3 is a schematic view of an arrangement of optical elements adapted to augment the transmitted fraction of the electrodeless discharge produced in the bulb of FIG. 1.

A system for providing such increased efficiency is illustrated schematically in FIG. 3, it being understood that to provide an optical communication system the elements of FIG. 3 are to be included in the complete structure of FIG. 1. As shown, a parabolic mirror 32 is placed behind the bulb 10, i.e. on the side thereof opposite to the plane mirror 24, with the bulb positioned at the focal point of the mirror 32, and a second parabolic mirror 33 is placed behind the photomultiplier tube 17, which is positioned at the focal point of the latter mirror and oriented to receive light reflected to it by this mirror. The mirror 32 serves to direct as a nearly parallel beam to the mirror 24, and thence to the mirror 33, that portion of the light from the bulb 32 emitted in a direction opposite to the mirror 24, while the mirror 33 serves to focus this transmitted light on the photomultiplier.

Figure 4:
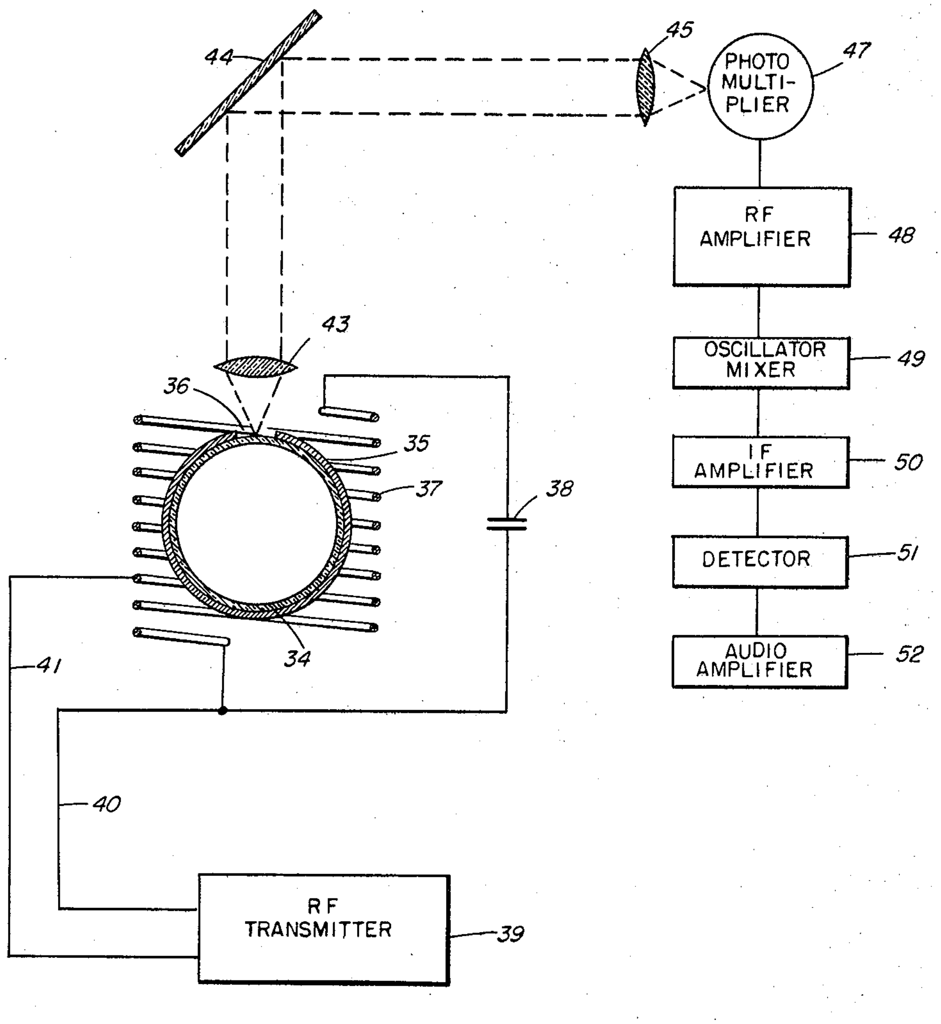
FIG. 4 is a diagrammatic view of another embodiment of the invention.

A still more efficient arrangement for utilizing the discharge in the bulb is indicated in FIG. 4. The embodiment of FIG. 4 includes a spherical mercury-containing bulb 34, identical in character and arrangement with the bulb 10 of FIG. 1, but completely surrounded by an internally reflective coating 35, shown as deposited on the external surface of the bulb 34 and having a small aperture 36 e.g. a few millimeters in diameter. As in FIG. 1, this bulb is positioned in the field of a coil 37 which is connected in parallel with a capacitor 38 to provide a resonant tank circuit and is energized by a conventional radio transmitter 39, the transmitter output terminals 40, 41 being connected to the tank circuit in the manner illustrated. It will be understood that the tank circuit and transmitter are identical in structure and function with the corresponding elements of the apparatus of FIG. 1.

The coating 35, which is non-conductive in character so as not to interfere with excitation of the vapor in the bulb by the field of the coil 37, may conveniently comprise a deposit of white magnesium oxide. If the coating were perfectly reflective, all light emitted by the electrodeless discharge in the bulb would necessarily emerge through the small aperture 36. With attainable approximations of such total reflectivity, this concentration of the emission through the aperture 36 can increase the specific intensity of the light emitted from the bulb by as much as a factor of 15 over the specific intensity of the luminous discharge from the uncoated bulb of FIG. 1, for a given power input to the tank circuit.

As indicated in FIG. 4, the concentrated, directional emission of modulated light from the coated bulb is directed through a positive collimating lens 43 positioned at a distance from the aperture 36 equal to the focal length of the lens. Thus the light from the bulb is advanced in a substantially parallel beam to a mirror 44 and thence to a second positive lens 45 positioned at a receiving station in spaced relation to a photomultiplier tube 47 at a distance therefrom equal to the focal length of the latter lens. This lens 45 serves to focus the collimated beam on the photomultiplier, with the result that a very advantageously large proportion of the total light produced by electrodeless discharge in the bulb 34 is received at the photomultiplier. In other words, this arrangement of elements, and in particular the apertured reflective coating on the bulb 34, provides a transmitted beam of greatly augmented intensity for a given power input, concomitantly increasing the range of the communications system for such power input. For reception of the transmitted signal the photomultiplier output may be connected (for example) to the antenna terminals of a conventional radio receiver, represented by the successive stages 48, 49, 50, 51, and 52, as in the apparatus of FIG. 1.

While in FIG. 4 the coating has been shown as applied to the exterior of the bulb, it will be appreciated that the bulb may be surrounded by a reflective surface in other ways with the same result. Thus the coating may be applied to the internal surface of the bulb, or alternatively an equivalent reflective surface may be provided by surrounding the bulb concentrically with an internally reflective sphere having a small aperture or transparent portion corresponding in dimension and position to the illustrated aperture 36.

The foregoing embodiments of the invention have been described with reference to excitation of the bulb by an amplitude-modulated radio frequency output from the transmitter 14 of FIG. 1 (or the corresponding transmitter 39 of FIG. 4) to produce an amplitude-modulated transmitted beam of light. However, since the characteristics of the intensity oscillation of the light output from the bulb 10 of FIG. 1 (or the bulb 34 of FIG. 4) are uniquely determined by the characteristics of the radio frequency output of the transmitter, alternative types of modulation may be employed for optical communication systems embodying the present invention. As a particular example, the transmitter 14 in FIG. 1 may be a frequency-modulation RF transmitter, e.g. of conventional design. Frequency modulation of the transmitter output as by a voice signal input to the transmitter from a microphone will produce a corresponding frequency modulation of the intensity oscillation of the light emitted by electrodeless discharge in the bulb. Interception of a beam of such frequency-modulated light by the photomultiplier tube 17 will cause the photomultiplier to produce a frequency-modulated RF carrier wave output; and if the photomultiplier output is connected to the antenna terminals of an appropriately tuned frequency-modulation short-wave radio receiver, the transmitted signal will be intelligibly reproduced, for example on a loudspeaker of the receiver.

In like manner, the light output from the bulb 10 can be phase-modulated by exciting electrodeless discharge in the bulb with the phase-modulated RF output of a phase modulation transmitter. The portion of this beam intercepted by the photomultiplier will cause the photomultiplier to produce a phase modulated RF output which can be demodulated for recovery of the transmitted intelligence by a tuned receiver of appropriate type. Again, other forms of modulation, such as single side band-suppressed carrier modulation, may if desired be employed.

When types of modulation other than amplitude modulation are used, however, there is no audio frequency flucuation in the intensity of the transmitted light and in consequence the photomultiplier will produce no wideband modulated noise output, so that noise-mode reception is not possible with such alternative types of modulation. In other words, when frequency modulation or phase or other types are employed, the output of the photomultiplier must be fed to the antenna terminals of a receiver tuned to the appropriate frequency to recover the message sent. Nevertheless, such tuned reception is as previously mentioned of very high quality, providing good signal to noise performance, and indeed is the preferred mode of reception. Thus the present invention enables effective optical communication employing any of the several types of modulation previously referred to.

It will also be appreciated that the apparatus and procedures detailed above are susceptible of other modifications. For example, while reference has been made to the use of mercury vapor, other gases may be employed in the bulb, e.g. xenon, krypton, neon, or other gases possessing the property of being excited by a high frequency electric field to produce an electrodeless discharge. Furthermore, while in the foregoing discussion operation at vapor pressures in the bulb of substantially less than one atmosphere has been contemplated, operation of the bulb at other and higher vapor pressures even substantially in excess of one atmosphere is also practicable. Again, while reference has been made above to inducing an electric field for excitation of electrodeless discharge in the bulb with a coil 11, it will be recognized by those skilled in the art that other means of providing such a field (for example, suitably arranged capacitor plates) can be used.

It is also to be observed that the light from the bulb 10 is shown as directed to the receiving station by a mirror 24 merely for convenience of illustration and that other optical means may be provided for so directing the emission from the bulb. Indeed, the bulb may itself be positioned so that the light emitted therefrom passes directly to the photomultiplier of the receiving station. However, the use of a mirror such as the plane mirror 24 illustrated in FIG. 1 or equivalent optical device for directing the beam facilitates changing the direction of transmission of the beam, e.g. by altering the angular position of the mirror 24, to facilitate transmission to any desired location within the range of the system. If desired, however, the transmission may be non-directional in character; that is to say, the bulb may be exposed in such manner as to emit light over a wide angle or indeed a solid angle of 360° so that a receiving station positioned at any point within the range of the system will detect such emission of light.

For particular applications, the present invention may be used to provide communications or other transmission of information along a light beam of predetermined wavelength. Thus, for example, in communications between submerged undersea craft, it is preferable to use light of green wavelength for communication over any substantial distance. The light emitted by mercury vapor, having a strong green line, is suitable for this purpose. Again, it may be desirable to limit the wavelength of the emitted modulated beam, for example to transmit messages on a beam of infrared energy only (the term light being herein used to denote wave energy of infrared as well as optical wavelengths). Mercury vapor may be used as a convenient source of such infrared radiation, since the emission of mercury has an infrared component; the excitation of mercury vapor in the bulb 10 with a modulated radio frequency transmitter output will thus produce a modulated infrared emission as well as a modulated emission of light of optical wavelength. By transmitting such emission through a narrow band pass filter adapted to permit passage only of infrared radiation, a beam of modulated infrared energy would be produced which could be used to transmit messages or other information in the manner previously described.

Finally, while the apparatus of FIG. 1 is shown as used to provide an optical communication system, it will be understood that the bulb and associated tank circuit and RF transmitter shown therein or in the modifications subsequently described may be employed to effect the transmission of information other than voice signals along a modulated beam of light, and for any other purpose as desired.

Figure 5:
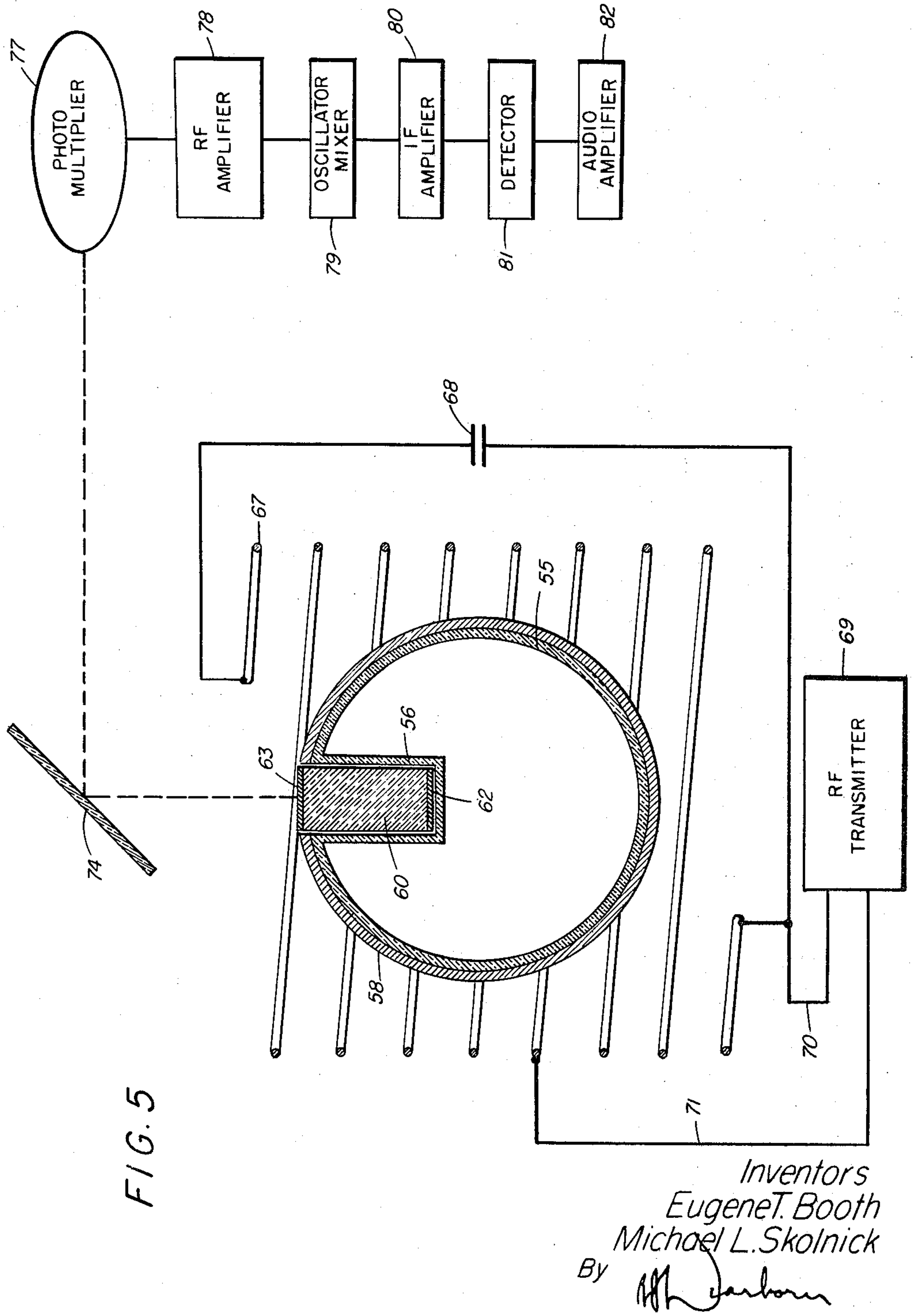
FIG. 5 is a simplified diagrammatic sectional view of a further embodiment of the invention, including a laser element, and arranged for energization of the laser element tby the electrodeless discharge produced in the bulb.

Referring now to FIG. 5, the embodiment of the invention therein illustrated (in highly simplified form) is adapted to produce a modulated beam of laser emissive energy by excitation of a laser with a modulated electrodeless discharge of the type hereinabove considered. Thus there is shown a bulb 55 of glass or like non-conductive transparent material, generally similar in character to the bulb 10 of FIG. 1. The bulb comprises an evacuated, sealed spherical chamber containing a few drops of mercury to provide a mercury vapor atmosphere. The wall of the bulb, however, has an indentation providing a recess 56 of cylindrical configuration extending into the interior of the bulb and adapted to receive a laser. The external surface of the bulb, except at this indentation, is covered with a suitable non-conductive reflective coating 58 e.g. of the same type as the coating 35 of the bulb in FIG. 4.

As shown, the recess 56 comprises a glass walled pocket extending into the bulb 55 and open at its outer end. Within this pocket is disposed a laser comprising a cylindrical rod like body 60 composed of solid laser material such as a neodymium-doped glass, positioned coaxially within the pocket and having opposed end surfaces 62, 63 covered with vacuum-evaporation deposited coatings of silver to provide reflective terminii of a resonant cavity coextensive with the laser body. The coating 62 at the end of the laser adjacent the inner end of the pocket is fully reflective, while the coating 63 at the outer end of the laser is partially transmissive to permit emission of an output beam of laser energy therethrough.

As will be understood, when light in wave-lengths of at least one absorption band of the laser material (herein referred to as pumping light) is directed into the laser body 60 through the side walls thereof, active atoms of the laser material are excited to undergo a series of transitions between energy levels, from a low initial energy level to a high energy level, referred to as the upper laser level, from which they subsequently shift again to a terminal low energy level, emitting light incident to the latter shift. If the population of atoms at the upper laser level created in the body by the pumping light exceeds the population of low level atoms (a condition referred to as an inversion of energy states) by a sufficient amount, laser action occurs, producing an output of laser emissive energy. The degree of inversion requisite for initiation of such laser action is referred to as the threshold condition and is dependent on energy loss factors in the laser structure.

In laser action, some of the atoms at the upper laser level shift spontaneously to the terminal level with concomitant emission of light and this spontaneously emitted light is reflected back and forth through the laser body between the opposed reflective resonant cavity terminii in multiple bidirectional reflections. The reflecting light in turn induces other upper level atoms to undergo light-emissive transitions to the terminal level, and owing to the configuration of the cavity structure such induced emission occurs very preferentially in modes for plane waves propagating parallel to the long axis of the laser body. The light produced by induced emission augments the bidirectionally reflecting light in the cavity to induce still further emissions of light from upper level atoms, with the result that a large bidirectionally reflecting beam of light quickly develops in the cavity. A portion of this beam is emitted through a partially transmissive end of the cavity (represented by the end 63 in the structure of FIG. 5) to constitute the light output of the laser, providing a coherent, highly monochromatic, very intense and extremely narrow beam of light which continues to be emitted for as long as the laser material remains at or above the threshold condition.

As will now be understood, electrodeless discharge from the mercury vapor in the bulb 55 provides the pumping light for the laser body 60. Since the bulb is surrounded by an internally reflective surface provided as by the coating 58, a very large proportion of the total light produced by electrodeless discharge in the bulb is concentrated on the surface of the laser body 60 through the transparent walls of the pocket 56. Because the emission of mercury vapor includes light in the absorptive wavelengths of neodymium, such light passing through the walls of the pocket (if sufficiently intense) serves to pump the laser and to produce an emission of coherent monochromatic light from the laser through the end face 63.

To produce electrodeless discharge in the bulb 55, the bulb is positioned in the field of a coil 67 which is connected in parallel with a capacitor 68 to provide a resonant tank circuit and powered from a conventional radio transmitter 69 through transmitter output terminals 70, 71 connected as shown, the tank circuit and transmitter again being substantially similar in structure and function with those of FIG. 1. After heating and igniting of the mercury vapor in the bulb in the manner previously described in connection with the operation of structure of FIG. 1, electrodeless discharge is maintained in the bulb by passing the output of the RF transmitter 69 through the coil 67. To provide light of sufficient intensity to pump the laser 60 above threshold, however, it is necessary to employ a much larger power input to the tank circuit than that contemplated for instance in the example given of operation of the structure of FIG. 1. Thus, for example, the transmitter 69 may provide a power input of 20 to 40 kw. to the tank circuit. Such large power input will result in an emission of light from the mercury vapor of comparatively broad spectral characteristics owing to the collision broadening produced by the heat resulting from the high power, but such collision broadening does not adversely effect the utilization of the electrodeless discharge in the bulb as pumping light for the laser.

As in the case of the structure of FIG. 1, the light produced in the bulb 55 by electrodeless discharge will oscillate in intensity at a radio frequency corresponding to the frequency of the output of the transmitter 69 which constitutes the power input to the tank circuit. Thus, for example, if the transmitter output is a carrier wave at 4 mc., the light produced by electrodeless discharge in the bulb will oscillate in intensity at frequency components of 4 mc. and the first harmonic, 8 mc. If the carrier wave output of the transmitter is modulated with respect to amplitude, or frequency, or in some other manner, the light produced in the bulb 42 will be correspondingly modulated.

This modulated light from the bulb 55, passing through the walls of the pocket 56 into the laser body 60, pumps the laser body to establish and maintain an inversion of energy states in the laser at or above threshold, with the result that a continuous beam of coherent monochromatic light of high intensity and very small beam spread angle will be produced by the laser, directed through the partially transmissive end face 63. If the frequency of the intensity oscillation of the pumping light from the bulb 55 is not greater than a given value (dependent on the properties of the particular laser material used in the body 60), this laser output oscillates in intensity at the same frequency as the pumping light. Accordingly, to provide a laser output beam of such radio frequency-oscillating intensity, the transmitter output frequency is selected to produce a pumping light oscillation of frequency not greater than the maximum frequency of which the laser material of the body 60 will respond to modulated pumping light by emitting an output beam of correspondingly oscillating intensity. By way of example, for a neodymium-doped glass laser body the preferred transmitter output frequency is in a range between about 0.3 and 0.5 mc.

Thus with the aforementioned upper frequency limit of the laser material observed, there is produced a laser output oscillating in intensity at the same frequency as the intensity oscillation of the pumping light; and if the pumping light is modulated as described, the laser output will be correspondingly modulated. Accordingly, if the laser output beam is directed to a receiving station e.g. comprising a photomultiplier tube 77 (identical with the photomultiplier 17 in FIG. 1) connected to a tuned radio receiver represented by stages 78, 79, 80, 81, and 82, the laser beam will serve to transmit intelligence to the receiving station, in exactly the same manner as the direct emission from the bulb 10 in the structure of FIG. 1. Owing however to the peculiar and well recognized characteristics of laser emissive energy, such as the narrowness of the beam spread angle and the intensity and coherent character of the light emitted, the use of a laser output beam as the transmitting medium enables optical communications over a far greater range (within the line of sight limit) than does the emission from the bulb itself.

The structure of FIG. 5 is shown in highly simplified form for convenience of illustration. In practice, with continuous laser operation and with the power input to the bulb of the large magnitude indicated above, it is necessary to provide cooling both for the laser and for the bulb. An effective liquid cooled laser structure is disclosed in the copending application of Eugene T. Booth, Serial No. 215,669, filed August 8, 1962, entitled Laser Structures and assigned to the same assignee as the present application. Such liquid cooled structure (comprising, for example, a series of parallel plates of laser material disposed in spaced relation along an axis between opposed reflective resonant cavity terminii and surrounded by a circulating flow of liquid coolant) may conveniently be included in the structure of FIG. 5, i.e. to provide the laser structure represented in simplified form by the rod 60, to constitute a laser element that can conveniently be maintained cooled during such continuous operation. The bulb 55 may be cooled by a current of air from a suitable blower or alternatively may be surrounded by a circulating flow of liquid coolant. In the latter case, the bulb could be positioned concentrically within a larger transparent sphere with means for introducing and removing coolant from the larger sphere so that a continuous flow of such liquid coolant may be passed in the space between the two spheres. If desired, the reflective surface represented by the coating 58 in FIG. 5 could be placed on the inner surface of this outer sphere.

It will be appreciated that the structure of FIG. 5 is susceptible of the several modifications discussed above in connection with the structure of FIG. 1. Thus the vapor in the bulb may be replaced with other gases which emit an electrodeless discharge of light of appropriate pumping wavelength, and arrangements for excitation of the gas other than the coil 67 may be used. Furthermore, laser materials other than neodymium, e.g. synthetic ruby, may be employed to provide the laser body 60.

In addition, while the spherical bulb of FIG. 5 represents a presently preferred configuration for the gas filled envelope in which electrodeless discharge occurs, a bulb of other configuration may be employed. For example, a bulb may be provided by a sealed cylinder of transparent material having a recess corresponding to the pocket 56 at one end to receive the laser body. It will be appreciated that in like manner a bulb of non-spherical configuration such as a cylinder may be substituted in the structure of FIG. 1 for the spherical bulb 10 there shown.

It is to be understood that the invention is not limited to the specific features and embodiments hereinabove set forth, but may be carried out in other ways without departure from its spirit.

We claim:

A laser structure comprising, in combination, means providing an active laser component, wave-energy reflective means passively terminating each end of a resonant cavity coaxial with said laser component, means providing an envelope of gas surrounded by a spherical internally reflective surface positioned and adapted to concentrate light emitted by said gas onto the surface of said laser component for energization of said component, means providing an output of radio-frequency electric power and including means for modulating said output by a signal representative of intelligence, and means energizable by said output to induce an electric field in said envelope effective to excite electrodeless discharge of light from said gas oscillating in intensity at radio frequency with characteristics of oscillation proportional to the corresponding characteristics of said output, said output having a magnitude effective to produce an emission of light in said envelope of sufficient intensity to maintain said laser component above the threshold condition for laser action.

References Cited by the Examiner

UNITED STATES PATENTS

| | | | |
|---|---|---|---|
| 2,032,588 | 3/1936 | Miller | 250—199 |
| 2,118,452 | 5/1938 | LeBel | 315—248 |
| 2,149,414 | 3/1939 | Bethenol | 315—248 |
| 2,790,936 | 4/1957 | Bell | 315—248 |
| 2,929,922 | 3/1960 | Schawlow et al. | 250—199 |
| 3,038,126 | 6/1962 | Robinson | 250—199 |
| 3,126,485 | 3/1964 | Ashkin et al. | 250—199 |
| 3,144,617 | 8/1964 | Kogelnik et al. | 250—199 X |
| 3,159,707 | 12/1964 | Bennett et al. | 250—199 X |

FOREIGN PATENTS

| | | |
|---|---|---|
| 608,711 | 3/1962 | Belgium. |
| 1,260,230 | 3/1961 | France. |
| 1,306,777 | 9/1962 | France. |
| 953,721 | 4/1964 | Great Britain. |

OTHER REFERENCES

Vogel et al.: Electronics, vol. 34, Nov. 10, 1961, pages 81–85.

DAVID G. REDINBAUGH, *Primary Examiner.*

J. W. CALDWELL, *Assistant Examiner.*